(12) United States Patent
Kobayashi et al.

(10) Patent No.: US 7,716,838 B2
(45) Date of Patent: May 18, 2010

(54) METHOD FOR MANUFACTURING A BEARING RING

(75) Inventors: Masaru Kobayashi, Nagano-ken (JP); Toshihiko Kaji, Hyogo-ken (JP)

(73) Assignees: Harmonic Drive Systems, Inc., Tokyo (JP); Sumitomo Electric Sintered Alloy, Ltd., Takahashi-shi (JP)

( * ) Notice: Subject to any disclaimer, the term of this patent is extended or adjusted under 35 U.S.C. 154(b) by 1359 days.

(21) Appl. No.: 11/169,179

(22) Filed: Jun. 28, 2005

(65) Prior Publication Data
US 2006/0000096 A1    Jan. 5, 2006

(30) Foreign Application Priority Data
Jul. 1, 2004    (JP)    ............... 2004-195634

(51) Int. Cl.
*B21D 53/10*    (2006.01)
(52) U.S. Cl. ............... 29/898.066; 29/898.06; 29/898.063; 384/569; 419/8
(58) Field of Classification Search ............ 29/898.063, 29/898.06, 898.066; 384/569; 419/8
See application file for complete search history.

(56) References Cited

U.S. PATENT DOCUMENTS

| | | | |
|---|---|---|---|
| 3,666,456 A | 5/1972 | Haller | |
| 3,727,999 A | 4/1973 | Dunn et al. | |
| 3,770,332 A | 11/1973 | Dunn | |
| 3,772,935 A | 11/1973 | Dunn et al. | |
| 4,145,798 A | 3/1979 | Sarnes | |
| 4,343,072 A * | 8/1982 | Beauchet | ............... 419/8 |
| 6,045,750 A | 4/2000 | Drake et al. | |

FOREIGN PATENT DOCUMENTS

| | | |
|---|---|---|
| EP | 0 278 682 | 8/1988 |
| EP | 0 623 761 A1 | 11/1994 |
| GB | 570 141 | 6/1945 |
| GB | 601 973 | 5/1948 |
| JP | 2000-186718 | 7/2000 |
| JP | 2002-339991 | 11/2002 |

OTHER PUBLICATIONS

European Patent Office Search Report dated Sep. 15, 2005 (3 pages).

* cited by examiner

*Primary Examiner*—Rick K Chang
(74) *Attorney, Agent, or Firm*—Flynn, Thiel, Boutell & Tanis, P.C.

(57) ABSTRACT

An outer ring of a cross roller bearing is a composite component having an outer ring main body portion constructed of a lightweight metal alloy and a raceway surface formation portion linked to an inner side thereof and constructed of a ferrous material. A ring for forming the raceway surface formation portion is preformed, and is inserted into a forging die, powder forging is performed using a metal powder for manufacturing the outer ring main body portion, a composite component is manufactured in which a ringshaped portion for forming the outer ring main body portion is integrally formed with the raceway surface formation ring, and an after-treatment is performed on the product.

11 Claims, 3 Drawing Sheets

METHOD FOR MANUFACTURING A BEARING RING

BACKGROUND OF THE INVENTION

1. Field of the Invention

The present invention relates to a method for manufacturing a lightweight bearing ring in which a portion forming a raceway surface of the bearing ring is formed from a ferrous material, and the remaining portion is formed from aluminum alloy or another lightweight material.

2. Description of the Related Art

The inner and outer rings of a bearing are manufactured from bearing steel, ductile cast-iron, and other high-density materials in order to maintain abrasion resistance and other properties of a raceway surface of a rolling element. A composite bearing ring made of a raceway ring main body member comprised of a light alloy and a raceway surface formation member comprised of a ferrous element is proposed in JP-A 2000-186718 for reducing the weight of the bearing. A method for manufacturing this composite bearing ring is proposed in JP-A 2002-339991.

SUMMARY OF THE INVENTION

A main object of the present invention is to provide a method for manufacturing a bearing ring in which a raceway surface formation portion formed from a material which has excellent abrasion resistance is securely and integrally formed with a raceway ring main body portion formed from a lightweight material.

According to the present invention, there is provided a method for manufacturing a bearing ring having an annular raceway ring main body portion formed from a first material, and an annular raceway surface formation portion which is formed from a second material having higher abrasion resistance and hardness than the first material and in which a raceway surface of a rolling element is formed on an outer peripheral surface or inner peripheral surface thereof, wherein these portions are integrally formed in concentric fashion; the manufacturing method comprising:

manufacturing a raceway surface formation ring for forming the raceway surface formation portion using the second material;

manufacturing an annular composite member in which the raceway ring main body portion is formed integrally with the raceway surface formation ring by performing powder forging using a powder of the first material while the raceway surface formation ring is fixed in a forging die; and performing a surface finishing treatment or other after-treatment on the composite member.

A configuration may be adopted herein whereby the annular composite member in which the raceway surface formation ring, a preform, and the remaining regions of the raceway ring main body portion are integrally formed by performing powder forging using the powder of the first material in a state in which the raceway ring main body portion is divided into a plurality of regions, at least a portion thereof is preformed using the powder of the first material, and the preform and the raceway surface formation ring are fixed in the forging die. By preforming, an insert during powder forging can be positioned with good precision in any position.

In the case of the inner/outer ring of a cross roller bearing or the like, the annular composite member is preferably manufactured in which the raceway surface formation ring, a first segment, and the remaining regions of the raceway ring main body portion are formed integrally by preforming the first of two segments that include a first and second segment with a shape that is obtained when the raceway ring main body portion is laterally divided in a plane perpendicular to a central axis thereof using the powder of the first material, and performing powder forging using the powder of the first material while the first segment and the raceway surface formation ring are fixed in the forging die.

Alternatively, a configuration may be adopted wherein the composite member is manufactured in which the raceway surface formation ring and the first and second segments are integrally formed by a process in which both the first and second segments are preformed, and powder forging is performed while the raceway surface formation portion and the first and second segments are fixed in the forging die.

Aluminum alloy, titanium alloy, and other light metal alloys or ceramics may be used as the first material. Bearing steel, die steel, ductile cast-iron, or stainless steel-titanium alloy may be used as the second material.

The present invention relates to a bearing ring whose distinguishing feature is that it is manufactured by the method described above.

In the method for manufacturing a bearing ring of the present invention, a raceway ring main body portion and a raceway surface formation portion comprised of different materials are integrally formed by powder forging. By appropriately selecting the materials of these portions, a highly durable, lightweight bearing ring can be manufactured by a simple process.

DESCRIPTION OF THE PREFERRED EMBODIMENTS

A wave gear device unit according to the present invention will be described hereinafter with reference to the drawings.

(Overall Structure)

Figure 1:
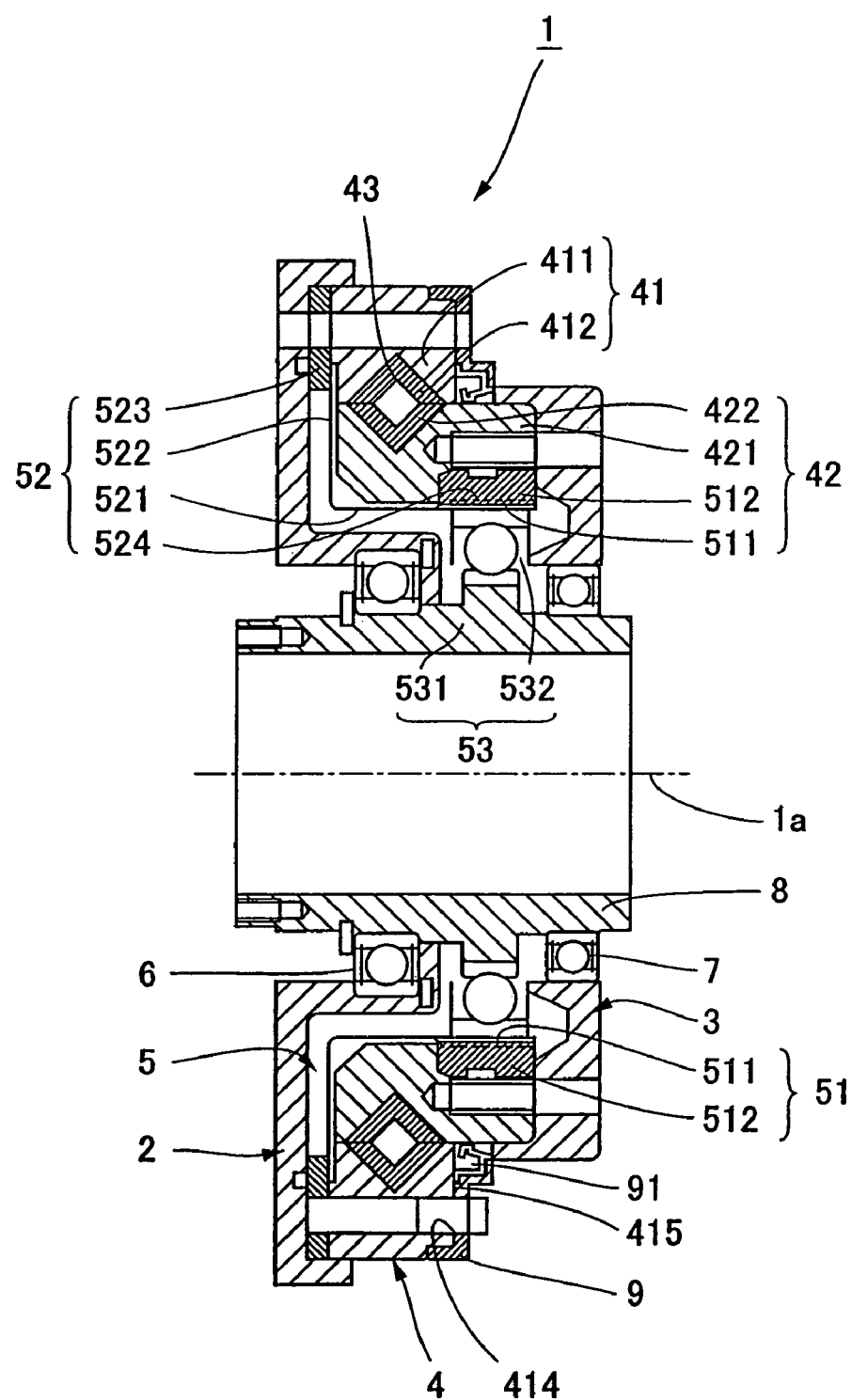
FIG. 1 is a schematic cross-sectional diagram of a silk hat shaped wave gear device unit according to the present invention.
Figure 2:
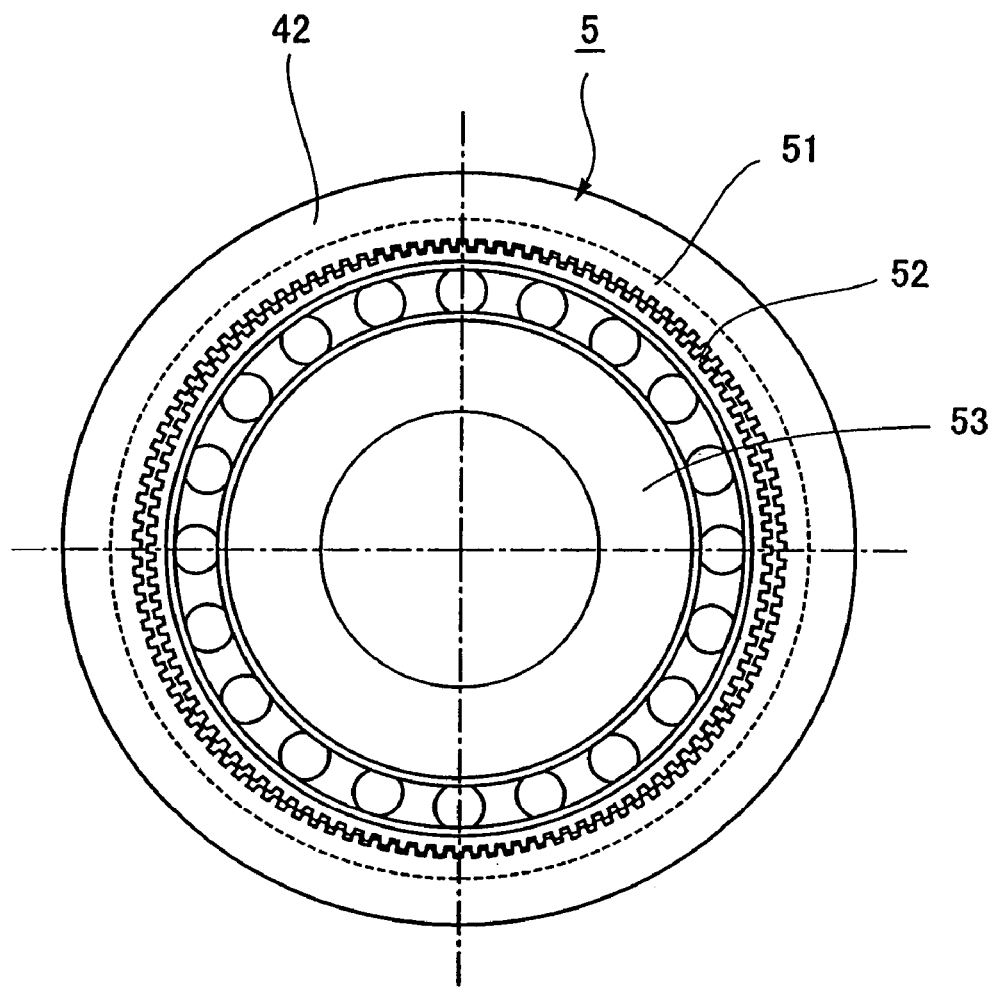
FIG. 2 is a diagram showing a structure of the wave gear device in FIG. 1.

FIG. 1 is a cross-sectional diagram of a wave gear device unit provided with a silk hat shaped wave gear device into which a lightweight cross roller bearing manufactured according to the present invention is incorporated. FIG. 2 is a diagram showing a structure of the silk hat shaped wave gear device.

A wave gear device unit 1 has a first end plate 2 and a second end plate 3 positioned with a fixed gap between the same in a direction of a unit axis line 1a, and a cross roller bearing 4 positioned between the first and second end plates 2 and 3. A silk hat shaped wave gear device 5 is built into a unit housing comprised of the first and second end plates 2 and 3 and an outer ring 41 of the cross roller bearing 4. A shaft hole is formed in a center of the first and second end plates 2 and 3, and a hollow input shaft 8 rotatably supported by ball bearings 6 and 7 is passed through the shaft hole.

The cross roller bearing 4 is provided with the outer ring 41 and an inner ring 42, and a plurality of rollers 43 inserted into an annular raceway formed in compartmental fashion between the inner and outer rings. The outer ring 41 is a composite component provided with an annular outer ring main body portion 411 and an annular raceway surface formation portion 412 that is formed integrally with an inner peripheral surface of the outer ring main body portion and has a raceway surface formed on an inner peripheral surface thereof.

As shown in FIG. 1, the raceway surface formation rings 412 and 422 are covered on their opposite and axially outwardly facing sides by the respective outer ring main body portions 411 and 421.

The inner ring 42 is a composite component provided with an annular shaped wide inner ring main body portion 421 and an annular raceway surface formation portion 422 that is formed integrally with an outer peripheral surface portion on a side of one end of the inner ring main body portion 421 and has a raceway surface formed on an outer peripheral surface thereof.

As shown in FIG. 1, the raceway surface formation rings 412 and 422 are covered on their opposite and axially outwardly facing sides by the respective outer ring main body portions 411 and 421.

The inner ring 42 in this arrangement is provided with an annular toothed portion 512 that is formed integrally with an inner peripheral surface portion on a side of the other end of the inner ring main body portion 421 and has an inner tooth 511 formed in an inner peripheral surface thereof. Specifically, the inner ring 42 in the present example is a component that also acts as a rigid internal gear of the silk hat shaped wave gear device 5 described hereinafter. The inner ring main body portion 421 of the inner ring 42 thus configured is fixedly fastened to the second end plate 3 by a tightening bolt not shown in the drawing.

The silk hat shaped wave gear device 5 is provided with an annular rigid internal gear 51, a silk hat shaped flexible external gear 52, and a wave generator 53 having an elliptical profile. The rigid internal gear 51 is formed integrally with the inner ring 42 of the cross roller bearing 4, as described above. Specifically, the annular toothed portion 512 in which the inner tooth 511 is formed in the inner peripheral surface thereof is formed integrally with the inner peripheral surface of the inner ring 42, which doubles as the internal gear.

The flexible external gear 52 is provided with a cylindrical body 521, an annular diaphragm 522 formed continuously with one end of the cylindrical body to extend radially outward, a thick annular boss 523 formed continuously with an outer peripheral edge of the diaphragm 522, and an external tooth 524 formed on an outer peripheral surface of the other end portion of the cylindrical body 521, and has a silk hat shape overall. The annular boss 523 is disposed between an annular end surface of the outer ring 41 of the cross roller bearing 4 and the first end plate 2, and is fixedly fastened to these components by a tightening bolt (not shown in the drawing). Consequently, the flexible external gear 52 and the rigid internal gear 51 can rotate relative to each other via the cross roller bearing 4.

The wave generator 53 is provided with an elliptically profiled rigid cam plate portion 531 formed on an outer peripheral surface of the input shaft 8, and a ball bearing 532, and this ball bearing 532 is fitted between an outer peripheral surface of the rigid cam plate portion 531 and an inner peripheral surface of a portion in which the external teeth 524 of the flexible external gear 52 are formed.

An annular plate 9 for forming a bolt flange is attached to an annular end surface 415 of the outer ring main body portion in which a bolt hole 414 formed in the outer ring main body portion 411 of the outer ring 41 opens, and this annular plate 9 is also fixedly fastened on a side of the outer ring main body portion 411 by a tightening bolt. A sealing ring 91 used as an oil seal is attached to a portion of the annular plate 9 on an internal peripheral edge side thereof, and a gap between the outer ring 41 and the inner ring 42 is sealed by this sealing ring 91.

In the silk hat shaped wave gear device unit 1 thus configured, a portion of the rotational input shaft 8 that protrudes from the second end plate 3 is connected and fixed to a motor output shaft or other rotation source. The first end plate 2 or second end plate 3 is also connected and fixed on a load side. When the rotational input shaft 8 rotates at high speed, a meshing portion of the external tooth 414 that is flexed in an elliptical shape by the elliptical wave generator 53 and is caused to mesh with the internal teeth 424 in two locations in the circumferential direction travels in a circumferential direction. Since there are different numbers of external teeth and internal teeth, relative rotation that corresponds to the difference in the number of teeth occurs between the external teeth and the internal teeth. This rotation is significantly reduced in speed compared with an input rotational speed. Since one of the first end plate 2 and second end plate 3 is connected to the load side, and the other is fixed so as not to rotate, reduced rotation is outputted and transmitted to the load side from the side of the end plate connected to the load side.

As described above, the outer ring 41 of the cross roller bearing 4 is the composite component comprised of the outer ring main body portion 411 and the raceway surface formation portion 412. The inner ring 42 is the composite component comprised of the inner ring main body portion 421, the raceway surface formation portion 422, and the toothed portion 512 in which internal teeth 511 are formed in the inner peripheral surface thereof.

The outer ring main body portion 411 and the inner ring main body portion 421 are formed from a lightweight material (first material) that is lighter than a ferrous material, and ceramics or a light metal alloy such as an aluminum alloy or titanium alloy, for example, may be used therein. In contrast, the raceway surface formation portions 412 and 422 in which the raceway surface is formed, and the toothed portion 512 in which internal teeth are formed are formed from of a ferrous material or other commonly used material (second material). For example, bearing steel, die steel, ductile cast-iron, stainless-steel-titanium alloy, and the like can be used to form these components.

Furthermore, in the present example, the input shaft 8 is also formed from aluminum alloy, titanium alloy, or another light metal alloy, or from plastic, a ceramic, or another lightweight material, and the rigid cam plate portion 531 of the wave generator 53 formed on the outer peripheral surface thereof is also formed from the same lightweight material.

(Method for Manufacturing the Outer Ring and Inner Ring of Cross Roller Bearing)

Figure 3:
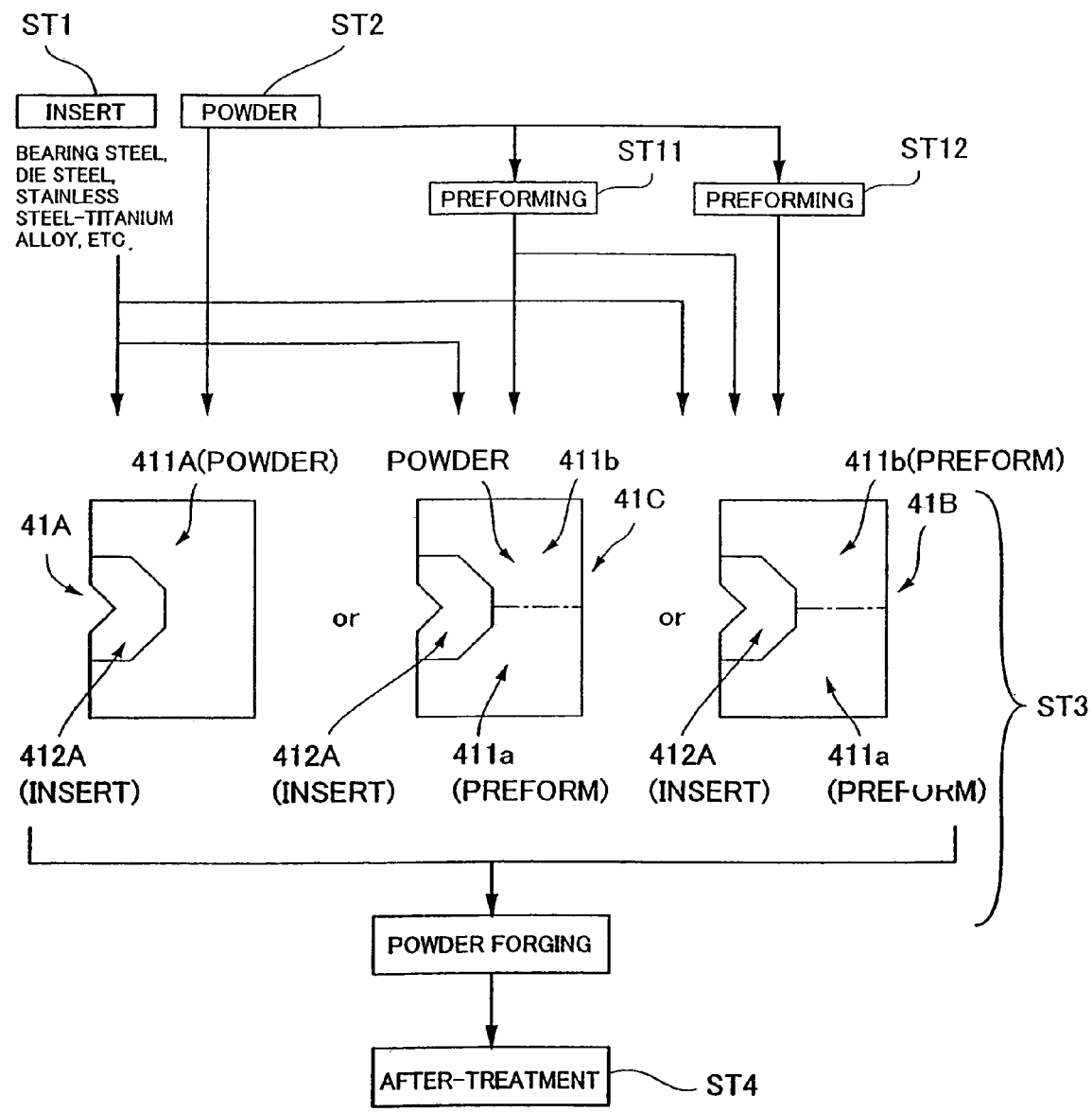
FIG. 3 is a diagram showing a manufacturing process of an outer ring.

The method for manufacturing the outer ring 41 that is a composite component will be described with reference to FIG. 3. First, a raceway surface formation ring 412A for forming the raceway surface formation portion 412 is manufactured from bearing steel, die steel, stainless steel-titanium alloy, or another second material (step ST1).

One or more types of starting material powder are admixed/mixed, and a metal powder (first material powder) is prepared for manufacturing the outer ring main body portion 411 (step ST2).

Powder forging using the metal powder is then performed in a state in which the raceway surface formation ring 412A is inserted into a forging die (step ST3). As a result, a composite component 41A used for the outer ring is obtained in which a ring-shaped portion 411A for forming the outer ring main body portion 411 on an outer peripheral side of the raceway surface formation ring 412A is integrally formed.

Sizing or another after-treatment is performed for this composite component 41A (step ST4), and the outer ring 41 is obtained.

The outer ring main body portion 411 may be preformed prior to powder forging in this arrangement. For example, first and second segments 411a and 411b having a shape that is obtained when the outer ring main body portion 411 is laterally divided in a plane perpendicular to a central axis thereof may be preformed in advance by compression molding, or by compression molding and heating/sintering (steps ST11 and ST12). The raceway surface formation ring 412A, and the segments 411a and 411b are mounted in the forging die, and powder forging is performed (step ST3). As a result, a composite component 41B is obtained in which the segments 411a and 411b are integrally formed into a ring-shaped portion 411A corresponding to the outer ring main body portion 411, while at the same time, the ring-shaped portion 411A and the raceway surface formation ring 412A are integrally formed. A prescribed after-treatment is performed for this composite component 41B (step ST4), and the outer ring 41 is obtained.

Only one of the first and second segments 411a and 411b may be preformed in advance. For example, only the first segment 411a is preformed in advance (step ST11), and powder forging is performed using the metal powder while this first segment and the raceway surface formation ring 412A are mounted in the forging die (step ST3). As a result, a composite component 41C is obtained in which the raceway surface formation ring 412A and the ring-shaped portion 411A corresponding to the outer ring main body portion 411 are integrally formed, and the outer ring 41 is obtained by performing an after-treatment on the composite component 41C (step ST4).

The inner ring 42 may be manufactured in the same manner. In the case of the inner ring 42 of the present example, the raceway surface formation portion 422 and the toothed portion 512 are formed in advance from a ferrous material, and powder forging is performed using metal powder while these members are mounted in the forging die, whereby a composite component can be obtained in which the raceway surface formation portion 422 and toothed portion 512 are integrally formed with the inner ring main body portion 421. The inner ring 42 is obtained by performing machining or the like to form inner teeth in the composite component.

OTHER EMBODIMENTS

The present invention was applied to a cross roller bearing in the example described above, but it is apparent that the present invention may also be applied in the same manner to a ball bearing or other type of bearing.

What is claimed is:

1. A method for manufacturing a bearing ring having an annular raceway ring main body portion formed from a first material, and an annular raceway surface formation portion formed from a second material having higher abrasion resistance and hardness than the first material and in which a raceway surface for rolling elements is formed on an outer peripheral surface or an inner peripheral surface thereof, wherein the above portions are integrally formed in concentric fashion, said manufacturing method comprising the steps of:

manufacturing a raceway surface formation ring for forming the raceway surface formation portion using the second material;

dividing the raceway ring main body portion into left and right halves in a plane perpendicular to a central axis of the raceway ring main body portion;

preforming the first and second divided segments using the powder of the first material;

manufacturing an annular composite member in which the raceway surface formation ring and the first and second divided segments are integrally formed by performing powder forging while the raceway surface formation ring and the first and second divided segments are mounted in a forging die; and performing a surface finishing treatment or other aftertreatment on the composite member.

2. The method for manufacturing a bearing ring according to claim 1, wherein:

the first material is one selected from a ceramic, and an alloy of aluminum, titanium or other light metals.

3. The method for manufacturing a bearing ring according to claim 1, wherein:

the second material is one selected from bearing steel, die steel, ductile cast-iron, and stainless steel-titanium alloy.

4. The method for manufacturing a bearing ring according to claim 1, wherein:

the first material is one selected from a ceramic and an alloy of aluminum, titanium or other light metal; and the second material is one selected from bearing steel, die steel, ductile cast-iron, and stainless steel-titanium alloy.

5. The method for manufacturing a bearing ring according to claim 1, wherein:

the bearing ring is an outer ring or inner ring of a cross roller bearing.

6. The method for manufacturing a bearing ring according to claim 1, wherein said step of manufacturing the annular composite member comprises mounting in the forging die the raceway surface formation ring axially between the first and second divided segments such that opposite and axially outwardly facing sides of the raceway surface formation ring are covered by the respective first and second divided segments.

7. The method for manufacturing a bearing ring according to claim 6, wherein said step of manufacturing the annular composite member comprises mounting in the forging die the raceway surface formation ring axially between the first and second divided segments such that the opposite and axially outwardly facing sides of the raceway surface formation ring are wholly covered by the respective first and second divided segments.

8. The method for manufacturing a bearing ring according to claim 1, wherein said step of manufacturing the annular composite member comprises mounting in the forging die the raceway surface formation ring axially between the first and second divided segments.

9. The method for manufacturing a bearing ring according to claim 1, wherein said step of preforming the first and second divided segments comprises compression molding.

10. The method for manufacturing a bearing ring according to claim 1, wherein said step of preforming the first and second divided segments comprises compression molding and sintering.

11. The method for manufacturing a bearing ring according to claim 1, wherein said step of preforming the first and second divided segments is performed prior to said step of manufacturing the annular composite member.

* * * * *